Jan. 17, 1939.  J. D. CHRISTIAN  2,143,842
FILTER DRIVE UNIT
Filed Oct. 30, 1937  2 Sheets-Sheet 1
FIG_1_
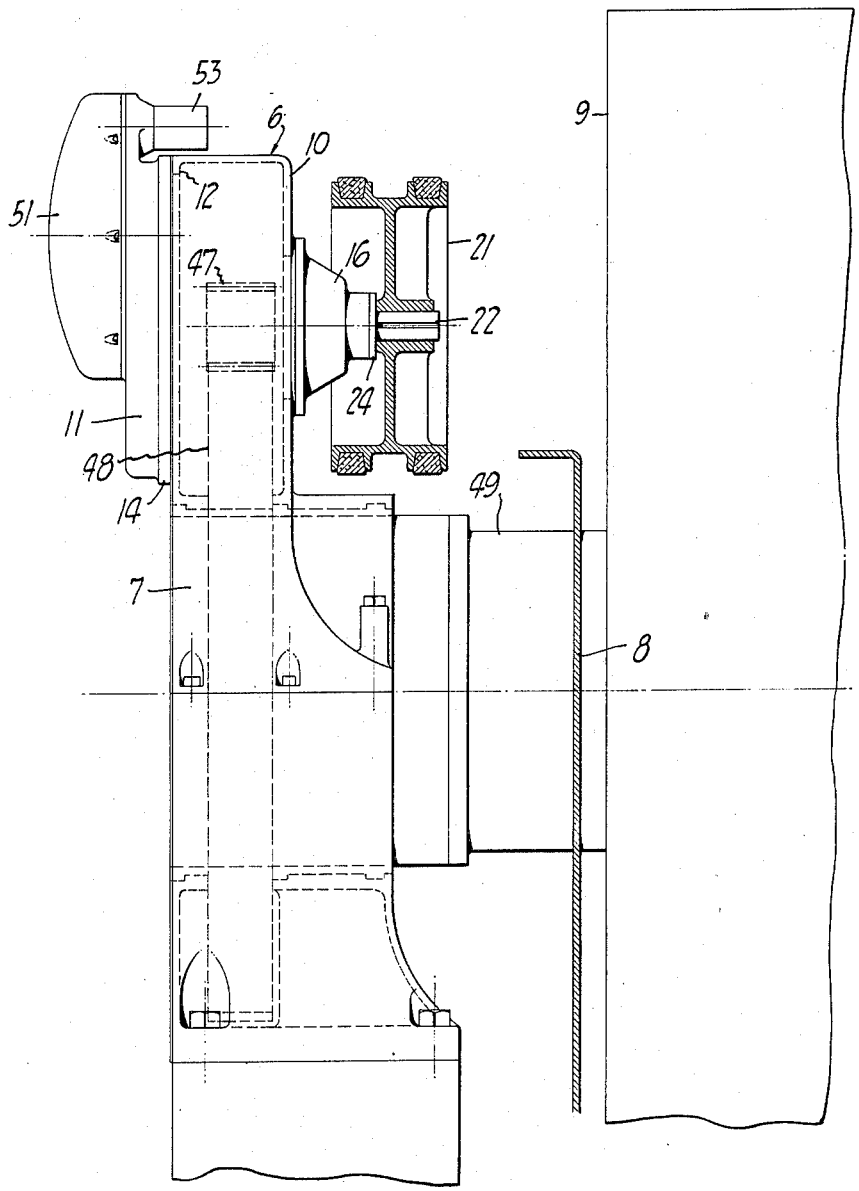
INVENTOR.
Joseph D. Christian
BY Robert H. Eckhoff
ATTORNEY.

Jan. 17, 1939. J. D. CHRISTIAN 2,143,842
FILTER DRIVE UNIT
Filed Oct. 30, 1937 2 Sheets-Sheet 2
FIG_2_
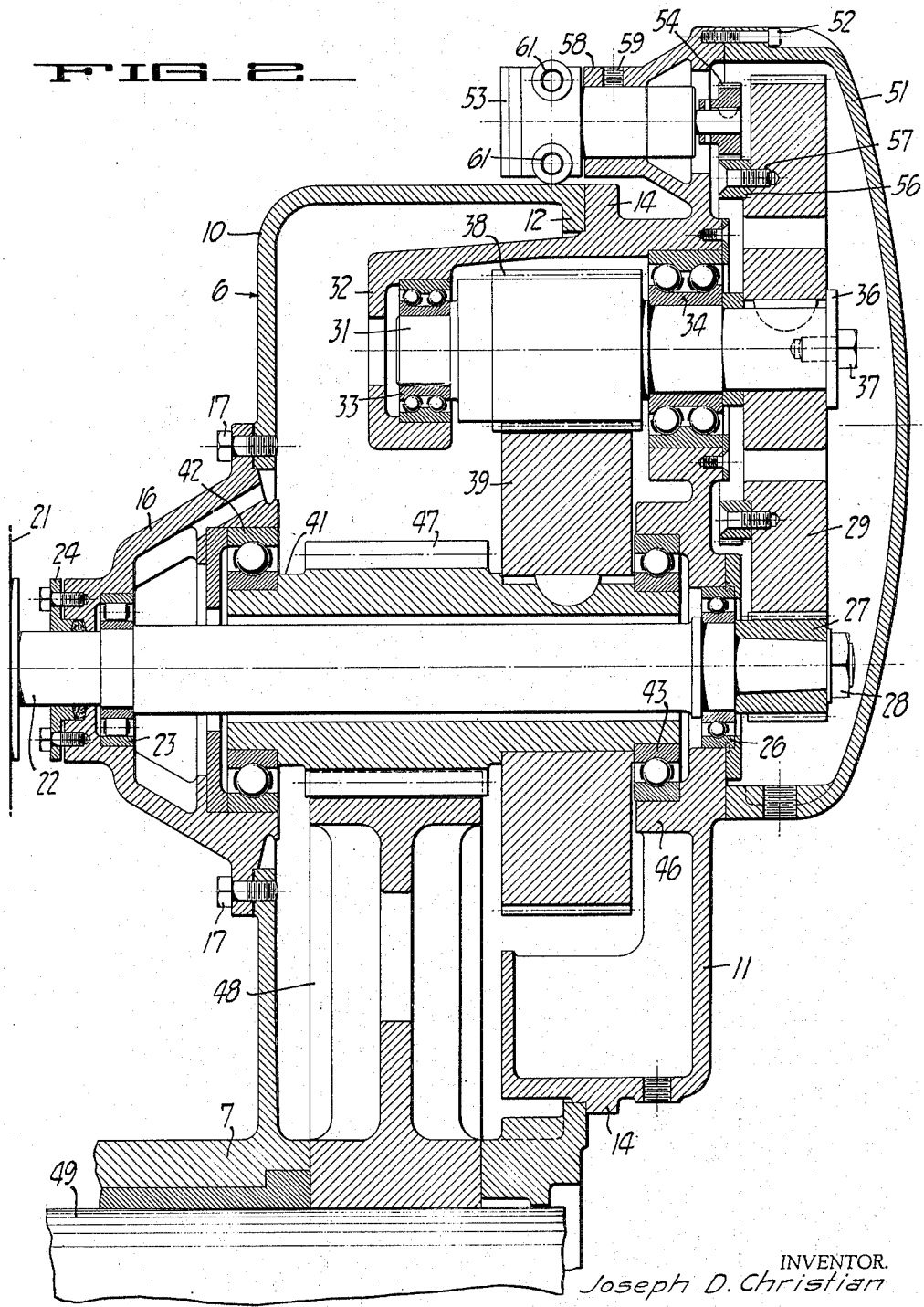
INVENTOR.
Joseph D. Christian
BY Robert H. Eckhoff
ATTORNEY.

Patented Jan. 17, 1939

2,143,842

UNITED STATES PATENT OFFICE 2,143,842

FILTER DRIVE UNIT

Joseph D. Christian, San Francisco, Calif.

Application October 30, 1937, Serial No. 172,018

6 Claims. (Cl. 74—421)

This invention relates to a speed reduction device.

This invention is particularly concerned with the provision of a compact speed reducing device which will nevertheless, even though quite compact, handle heavy loads. In directly adapting a speed reduction device to many industrial units, for example, to a filter, the speed reducer is mounted upon the device as a portion thereof. In accordance with this invention, I provide a speed reduction device which can be placed in and mounted upon a unit such as a filter to occupy relatively small space. Further, in accordance with this invention, the internal construction of the device is such that a heavy variable side pull can be exerted upon the device and the stresses suitably cared for in the device.

It is in general the broad object of the present invention to provide a compact speed reduction device which will handle heavy loads.

Another object of the present invention is to provide a speed reduction device of a novel construction.

A further object of the present invention is to provide a speed reduction device in which a novel arrangement of reduction elements is present.

The invention includes other objects and features of advantage, some of which, together with the foregoing, will appear hereinafter wherein the present preferred form of speed reduction device of my invention is disclosed.

In the drawings accompanying and forming a part hereof Figure 1 illustrates the device of my invention as mounted upon an industrial unit, in this case a filter.

Figure 2 is a section taken through the speed reduction device as it is mounted upon the filter.

As it appears in the drawings, the speed reduction unit, indicated generally at 6, is mounted on a filter bearing housing 7, associated with filter tank 8. The unit is in such relation to the filter drum 9 that unless the speed reduction device is of a minimum overall length the length of the filter has to be increased. The clearance between the speed reduction unit 6 and the filter drum 9 has to be kept to a minimum, for an increase in overall unit length increases the weight of the filter because the tank structure has to be lengthened out. When it is pointed out that the average weight of a filter to which the device is applied is about thirty tons, the undesirability of any such increase will be apparent.

To achieve the novel speed reduction device of the present invention, I provide a two-part casing made up of a wall member 10 being a part of housing 7 and a wall member 11. Member 10 is suitably flanged as at 12, and is secured to flange 14 on wall member 11. A bearing support member 16 is secured by studs 17 to wall 10 of housing 7. Member 11 is mounted upon housing 7 and is secured thereto so that the entire casing structure, as provided by wall members 10 and 11 and bearing support member 16, are rigidly secured together and are suitably mounted upon the wall 10 and flange 12.

In driving an industrial unit such as a filter the power input is ordinarily by means of a suitable V belt pulley drive, a chain or socket, or direct gear connection. This is generally indicated by element 21 mounted upon power input shaft 22, which extends into the casing provided by members 10, 11 and 16. In accordance with this invention I mount element 21 adjacent to drum 9.

A roller bearing 23 is mounted on bearing support member 16 and a stuffing gland generally indicated at 24 is provided in member 16 to protect the bearing and retain oil therein. The shaft extends completely across the unit, another supporting bearing indicated at 26 being mounted on wall member 11 so that a wide spread of the bearings on the power input shaft is secured. This enables a heavy side pull to be placed upon the input element 21 on the shaft 22. A pinion gear 27 is secured as by nut 28 on the end of the power imput shaft, this gear being meshed with a larger gear 29 carried upon countershaft 31. Since wall 11 is on the outside of the filter the length of shaft 22 is limited unduly.

The wall member 11 includes an extension 32 thereon, this extension supporting a ball bearing 33 for the outboard end of the countershaft 31. The wall member 11 carries another ball bearing 34 supporting the shaft 31 at an intermediate point. Gear 29 is secured as by washer 36 and stud 37 to an overhanging end of shaft 31. Since shafts 22 and 31 rotate at comparatively high speeds, it is practical, I have found, to have the gears on these shafts supported on overhanging ends of the shafts, particularly since the overhanging portion is quite small. Ordinarily an overhanging shaft of a speed reduction unit is not a desirable feature, but the present construction makes this possible.

Countershaft 31 is formed with a pinion gear 38 integral therewith, this pinion gear meshing with another gear 39. Gear 39 is removably keyed upon a hollow shaft indicated generally at 41.

Shaft 41 is mounted upon ball bearings 42 and 43, respectively, carried in bearing support member 16 and in a flange 46 formed upon wall member 11. A portion of the hollow shaft 41 has a pinion gear 47 formed thereon, this gear meshing with the drive gear 48 on filter drum shaft 49. Shaft 41 is hollow and shaft 22 passes therethrough, being inserted from the right in Figure 2. This construction provides compactness and yet permits adequate strength to be provided.

Gears 27 and 29, and other portions of the structure, are preferably enclosed by suitable metal case 51 secured in place by studs 52 and attached to wall member 11 to provide an oil-tight seal.

In view of the mounting of the unit upon the top of the filter, I preferably provide a force feed oil pump indicated at 53. This pump includes a drive gear 54 which is in turn driven by ring gear 56 secured by screws 57 to the face of gear 29. The oil pump is slipped into place in an aperture provided in extension 58 on wall member 11, the unit being retained in place by set screw 59. Suitable piping indicated at 61 extends from the oil pump to pick up oil from the sump on the main bull gear case, that is at the bottom of housing 7, and forces the oil in a constant stream to flush the bearings and gears in the reduction unit.

I claim:

1. In a device of the character described, a casing including opposite spaced walls, a hollow gear, a bearing in each wall for supporting said gear, a shaft extending through and beyond said gear on each side thereof, a bearing in each wall for said shaft, said shaft extending beyond said casing at one end thereof to provide for power input, a gear on the other end of said shaft, and gearing connecting the hollow gear and the gear on the shaft end.

2. In a device of the character described, a casing including opposite spaced walls, a hollow gear, a bearing in each wall for suporting said gear, a shaft extending through and beyond said gear on each side thereof, a bearing in each wall for said shaft, said shaft extending beyond said casing at one end thereof to provide for power input, and beyond the wall adjacent the other end of said shaft, a gear on the other end of said shaft, said adjacent wall having an extension thereon, a countershaft, bearings in said adjacent wall and in said extension for said countershaft, gears carried by the countershaft and hollow gear for connecting the hollow gear and the gear on the shaft end.

3. In a device of the character described, a casing including opposite spaced walls, a hollow gear, a bearing in each wall for supporting said gear, a shaft extending through and beyond said gear on each side thereof, a bearing in each wall for said shaft, said shaft extending beyond said casing at one end thereof to provide for power input, and beyond the wall adjacent the other end of said shaft, a gear on the other end of said shaft, said adjacent wall having an extension thereon, a countershaft extending on each side of said adjacent wall with an end thereof overhanging, bearings in said adjacent wall and in said extension for said countershaft, a first gear on said overhanging countershaft end, a second gear on said extending shaft end meshed with said first gear, a pinion gear on said countershaft between said bearings, and a third gear carried by said hollow gear and meshed with said pinion gear.

4. In a device of the character described, opposite spaced walls, a shaft extending beyond each wall, bearings supporting said shaft in said walls, a gear on one end of said shaft, a gear body hollowed out to pass said shaft, said body surrounding a portion of said shaft and carrying two gears of different size, a take off gear meshed with one of said two gears, and gearing connecting the other of said two gears and said gear on said shaft end.

5. In a device of the character described, opposite spaced walls, a shaft extending beyond each wall, bearings supporting said shaft in said walls, a gear on one end of said shaft, a gear body hollowed out to pass said shaft, said body surrounding a portion of said shaft and carrying two gears of different size, a take off gear meshed with one of said two gears, gearing connecting the other of said two gears and said gear on said shaft end, and a power input element on the other shaft end.

6. In combination with a mechanism to be driven including a rotatable element extending therefrom, a housing including opposite spaced walls, bearing means supporting said element in said housing for rotation, a driven gear on said element between said walls and within said housing for rotating said element, a power input shaft journalled in said housing walls for driving by a prime mover, a drive gear on said shaft, a countershaft journalled in the housing, a first gear on said countershaft driven by said drive gear, a second gear on said countershaft, a hollow gear structure journalled in said housing, and passing said power input shaft, and including two gears thereon, one of said gears being driven by said second gear and the other driving the driven gear on said element.

JOSEPH D. CHRISTIAN.